March 23, 1971    F. DURAND    3,572,150
MOTION TRANSMITTING DEVICES
Filed May 15, 1969    2 Sheets-Sheet 1
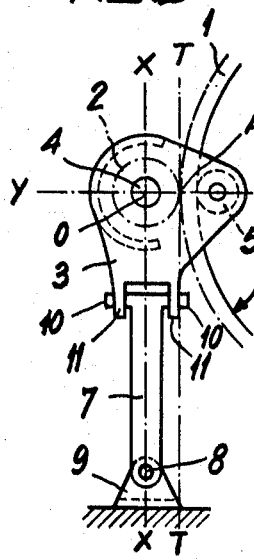
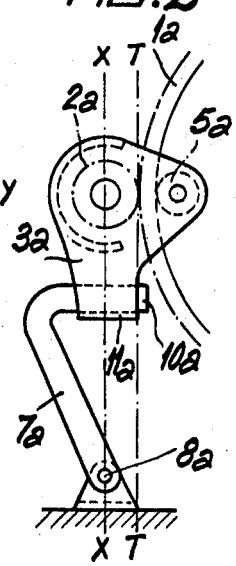
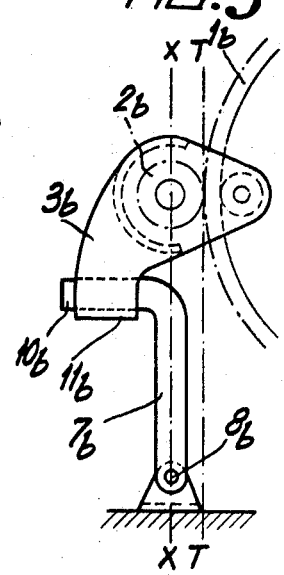
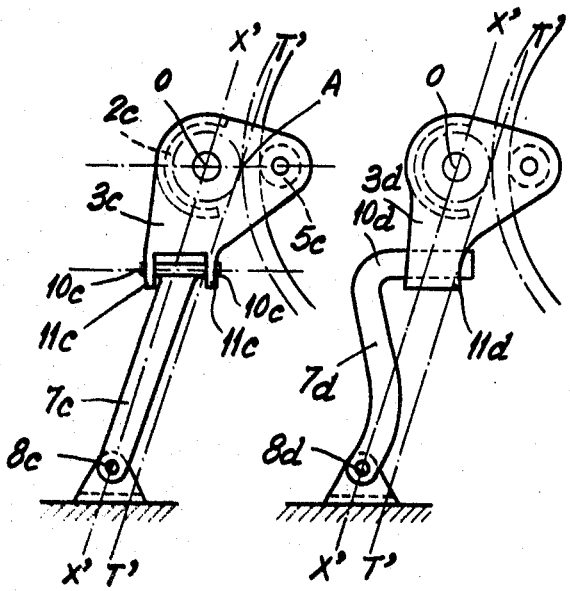
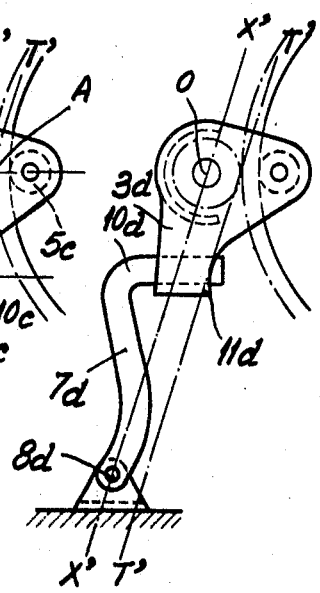
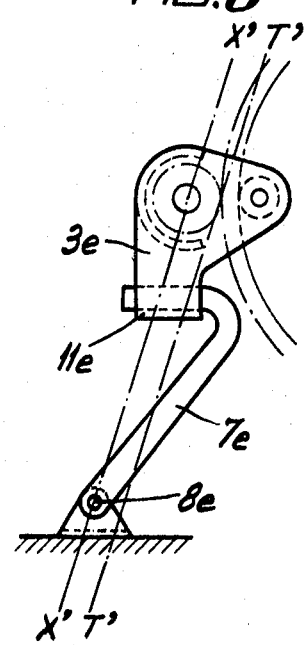
INVENTOR
FRANCOIS DURAND

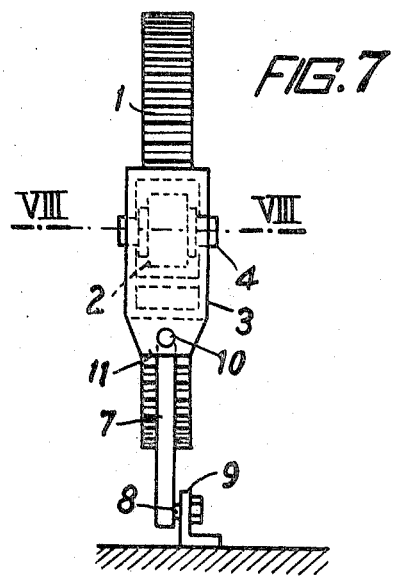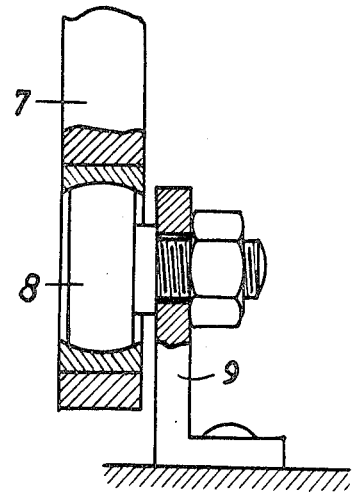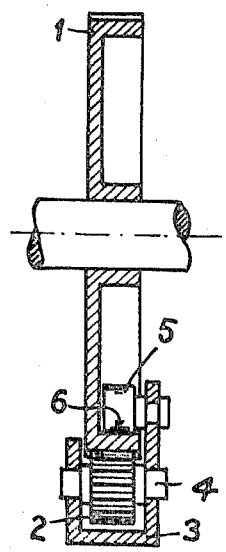

United States Patent Office 3,572,150
Patented Mar. 23, 1971

3,572,150
MOTION TRANSMITTING DEVICES
Francois Durand, 108 Boulevard Carnot,
Le Vesinet, Yvelines, France
Filed May 15, 1969, Ser. No. 824,809
Claims priority, application France, May 21, 1968,
152,616
The portion of the term of the patent subsequent to
Aug. 19, 1986, has been disclaimed
Int. Cl. F16h 57/00
U.S. Cl. 74—410                                    4 Claims

ABSTRACT OF THE DISCLOSURE

A device designed for driving a toothed relatively large gear or annulus by means of a toothed pinion mounted in a support independent of the fixed structure carrying said gear or annulus. This support comprises only a roller engaging a track formed on the toothed gear or annulus, concentrically to the teeth thereof, said roller having its axis disposed in the plane comprising the axis of the driving pinion and the axis of the driven gear or annulus. A retaining rod connects this support to a single fixed point. This rod is pivoted to said point by means of universal joint, but it is pivoted to the pinion support by means of a pin of which the axis forms a certain angle with respect to the theoretical axis of said rod.

---

The present invention relates to a motion transmitting device of the type described and illustrated in the U.S. Pat. No. 3,176,533.

This device is designed for driving a toothed relatively large gear or annulus by means of a toothed pinion mounted in a support independent of the fixed structure carrying said gear or annulus. In fact, this support is connected to a single fixed point by means of a coupling or retaining rod pivoted at both ends by means of universal joints so as to allow a certain three-dimensional liberty of movement of the pinion support in the space.

Under these conditions this transmission device is advantageous in that it leaves to the pinion a sufficient liberty of orientation in the space so that its teeth can properly and automatically engage with their maximum surface area the teeth of the gear or annulus, even in case the toothed annulus had defects such as buckling or warping.

In the various forms of embodiment described in the head patent the pinion support is provided with a number of rollers engaging a track formed on the toothed gear or annulus, concentrically to the teeth thereof. The function of these rollers is to somewhat guide the pinion support in relation to the gear teeth, and if desired some of said rollers may also have the function of maintaining the meshing engagement between the pinion and gear. These last-named rollers are then caused to engage a track formed on the inner side of the toothed gear or annulus.

However, a complementary function of these rollers is to prevent the pinion support from pivoting about the pinion axis. To this end, these rollers are disposed on either side of a plane comprising the axis of the driven gear or annulus and the axis of the driving pinion.

I contrast thereto, it is the essential object of the present invention to provide a transmission device of the type set forth hereinabove but comprising only one roller having its axis disposed in the plane comprising the axis of the driving pinion and the axis of the driven gear or annulus, said roller being caused to engage a track formed on the inner side of the gear or annulus so as to maintain the meshing engagement between the pinion and the gear or annulus. Of course, this single roller may be replaced by two rollers having their axes disposed in a common plane.

However, due to the presence of a single roller or pair of rollers arranged as explained in the last paragraph hereinabove, the pinion support could be led to pivot about the pinion axis. Therefore, in order to somewhat limit this possibility of pivotal movement, the universal joint articulation of the head patent is replaced by the articulation of the coupling rod to the pinion support in the tangential direction consists of a pin of which the axis forms a certain angle with respect to the theoretical axis of said rod.

When the transmission device is inoperative, this pivot axis extends preferably in the mesial plane of the pinion teeth, i.e. the plane passing through the middle of these teeth and at right angles to the pinion axis. Therefore, this pivot axis itself extends at right angles to the plane tangent to the driven gear or annulus, this last-named plane containing the line of meshing engagement between the gear and pinion. Under these conditions, this pivot pin will check the pivotal movements of the pinion support about the pinion axis.

A few typical forms of embodiment of the device according to this invention will now be described by way of example with reference to the accompanying drawing, in which:

FIGS. 1 to 6 illustrate diagrammatically in side elevational view the different forms of embodiment of the invention;

FIG. 7 is an end view showing in elevational the device illustrated in FIG. 1;

FIG. 8 is a section taken along the line VIII—VIII of FIG. 1, and

FIG. 9 is a detail view of the same device.

In the example illustrated in FIG. 1 and in FIGS. 7 to 9, the relevant transmission device is designed for driving an externally toothed gear or annulus 1. To this end, the device comprises a driving pinion 2 mounted in a support 3 independent of the fixed structure (not shown) supporting the gear or annulus 1, the pinion shaft 4 being trunnioned in adequate bearings or bores provided in the walls or flanges of said support 3.

The proper meshing engagement betwen the pinion 2 and the teeth of gear 1 is maintained by a roller 5 carried by said pinion support 3 and kept in rolling engagement with a track or race 6 provided to this end internally of the gear 1. This track or race 6 is concentric to the gear teeth. Preferably, the shaft or pin of this roller 5 is mounted in a ball-and-socket joint carried by said support 3.

It will be noted that in the inoperative position of the transmission device the axis of roller 5 lies in a plane Y—Y containing the theoretical axis O of pinion 2 and the axis of gear 1. Thus, the roller 5, of which the function consists in maintaining the proper meshing engagement between the pinion teeth and the gear teeth, is movable only in this plane, so that the pinion support 3 would be allowed to pivot about the axis of said pinion.

However, this support is retained in the tangential direction by a coupling rod or bar 7 having one end pivoted to a fixed member 9 and the other end pivoted to the pinion support 3.

In the inoperative condition this coupling rod lies in the mesial plane of the pinion teeth, i.e. the plane passing through the middle of these teeth and extending at right angles to the pinion axis.

Besides, if this transmission device does not comprise any primary reducing gear, the axis X—X of this coupling rod 7 will pass through the center of pinion 2. In the inoperative condition it is parallel to the tangent T—T to the toothed gear, which tangent passes through the middle of the line of contact or meshing engagement between the gear teeth and the pinion teeth.

However, if the transmission device comprises a primary reducing gear, the arrangement of the coupling rod 7 is modified so that its axis X—X will be coincident with the tangent T—T.

But in either case the essential feature characterizing this device lies in the fact that only one end of the coupling rod 7 comprises a universal joint, namely the end pivoted to a fixed member 9 by means of a swivel or ball-and-socket joint 8.

On the other hand, the opposite end of this coupling rod 7 is pivoted to the pinion support 3 by means of a pin forming a certain angle with the theoretical axis X—X or T—T of the coupling rod.

In the example illustrated in FIG. 1, this theoretical axis is materialized by a pair of trunnions 10 provided on either side of this rod and engaging the flanges 11 of a strap carried by the pinion support.

As can be seen in the drawing the pivot pin thus provided has its axis disposed in the mesial plane of the pinion teeth, i.e. the plane passing through the middle of these teeth and extending at right angles to the pinion axis.

Under these conditions, the possibilities of pivotal movement of the pinion support 3 about the pinion axis are somewhat limited and checked by the specific form of articulation of the coupling rod 7 to this support. However, this support is still allowed a certain liberty of movement in the space, so that it can swivel and position itself automatically and in the proper position so that the pinion teeth engage with their maximum surface area the teeth of the gear or annulus, even if the latter has certain defects such as buckling or warping.

FIG. 2 illustrates another exemplary form of embodiment of the transmission device according to this invention. This device differs from the preceding one only in that the coupling rod 7a, instead of carrying two trunnions 10, comprises an elbow-forming or like bent portion 10a at its end portion pivoted to the pinion support 3a. This bent portion is pivotally mounted in a bearing formed in a lug 11a carried by said pinion support 3a, whereby it acts inherently as a pivot pin of the coupling rod 7a with respect to said support.

FIG. 3 illustrates another exemplary form of embodiment constituting a similar arrangement wherein the coupling rod 7b is simply bent in a different manner.

FIG. 4 shows another typical form of embodiment similar to that illustrated in FIG. 1, with the only difference that the axis X'—X' of coupling rod 7c is inclined with respect to the plane tangent to the driven gear and contains the line of meshing engagement between this gear and the driving pinion.

However, the mode of operation of these two forms of embodiment (i.e. of the devices shown in FIG. 4 and FIG. 1) remains unchanged. Of course, the arrangement thus contemplated and illustrated in FIG. 4 is applicable only in case no primary reducing gearing were provided in the device.

In fact, when such reducing gearing is provided in the device the disposal of the coupling rod 7c must be so modified that its axis follows a line T'—T' containing the line of contact or meshing engagement between the pinion 2c and the driven gear. However, in the alternate form of embodiment illustrated in FIG. 4 this line is not tangent to the driven gear, in contrast to the arrangement illustrated in FIG. 1.

FIGS. 5 and 6 illustrate two further exemplary forms of embodiment of the device which constitutes modifications of the preceding two examples shown in FIGS. 2 and 3, but wherein the axis X'—X' or T'—T' of the coupling rod (7d or 7e) is inclined as in the case of FIG. 4.

In these various examples the specific pivotal mounting of the coupling rod to the pinion support permits of properly limiting and somewhat checking the pivotal movement of this support in relation to the pinion axis.

However, the above-described devices illustrated in diagrammatic form in the accompanying drawings should not be construed as limiting the scope of the invention, since many other constructional modifications and variations may be brought to the transmission device constituting the subject-matter of this invention, without however departing from the basic principles thereof.

Thus, the guide roller 5 carried by the pinion support 3 may if desired be caused to roll along a track or race disposed externally of the driven gear or annulus. However, since in this case the roller cannot exert its function of maintaining the proper meshing engagement between the pinion and gear, other suitable means must be provided therefore, for example in the form of a pressure bar.

Besides, the single guide roller illustrated herein may be replaced by two rollers having their axes disposed in a common plane i.e. the plane containing the axis of gear 1, and the axis of pinion 2.

What I claim as new is:

1. A motion transmitting device for driving an externally, relatively large toothed gear supported by a fixed structure, said device comprising in combination a pinion for driving said gear by meshing engagement therewith, means for supporting said pinion, said means being independent of said driven gear supporting structure, at least one roller provided on said pinion supporting means and adapted to guide said pinion supporting means in relation to the outer periphery of said driven gear, the axis of said roller lying in a plane comprising the axis of said driving pinion and the axis of said driven gear, a retaining rod adapted to hold against movement said pinion supporting means in the tangential direction in relation to said gear, one end of said rod being pivotally attached to a fixed point by means of a universal articulation, the opposite end of said rod being pivotally connected to said pinion supporting means through the medium of a pivot pin forming an angle in relation to said rod.

2. A device as set forth in claim 1, wherein the axis of the pivot pin connecting said retaining rod to said pinion supporting means lies in the mesial plane of the pinion teeth, i.e. in the plane extending through the middle of said teeth, said plane being perpendicular to the pinion axis.

3. A motion transmitting device as set forth in claim 1, wherein the pivot pin whereby said retaining rod is pivotally connected to said driving pinion supporting means consists of at least one trunnion carried by the corresponding end of said rod and engaged in a lug rigid with said pinion supporting means.

4. A motion transmitting device as set forth in claim 1, wherein the pivot pin whereby said retaining rod is pivotally connected to said driving pinion supporting means consists of a bent extension of the relevant end of said rod, said extension being pivotally engaged in a bearing provided to this end in said pinion supporting means.

References Cited

UNITED STATES PATENTS 3,461,735   8/1969   Durand _____ 74—410

LEONARD H. GERIN, Primary Examiner